(12) United States Patent
Krespach et al.

(10) Patent No.: US 8,519,632 B2
(45) Date of Patent: Aug. 27, 2013

(54) DRIVE DEVICE AND METHOD FOR OPERATING AT LEAST ONE SERIES CIRCUIT OF LIGHT-EMITTING DIODES

(75) Inventors: Andreas Krespach, Renningen (DE); Stephan Wenk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 12/305,628

(22) PCT Filed: Dec. 11, 2007

(86) PCT No.: PCT/EP2007/063702
§ 371 (c)(1),
(2), (4) Date: Sep. 25, 2009

(87) PCT Pub. No.: WO2008/071700
PCT Pub. Date: Jun. 19, 2008

(65) Prior Publication Data
US 2010/0013411 A1    Jan. 21, 2010

(30) Foreign Application Priority Data
Dec. 15, 2006 (DE) .......................... 10 2006 059 355

(51) Int. Cl.
*H05B 37/02* (2006.01)
(52) U.S. Cl.
USPC ........................................ 315/291; 315/307
(58) Field of Classification Search
USPC ................... 315/291, 307, 312, 185 R, 209 R
See application file for complete search history.

(56) References Cited

U.S. PATENT DOCUMENTS

| 6,466,188 | B1 * | 10/2002 | Cato ................................ 345/82 |
| 6,864,641 | B2 * | 3/2005 | Dygert .......................... 315/216 |
| 7,116,086 | B2 * | 10/2006 | Burgyan et al. ................ 323/271 |
| 7,352,135 | B2 * | 4/2008 | Shiotsu et al. ................. 315/247 |
| 7,479,743 | B2 * | 1/2009 | Namba et al. ................. 315/307 |
| 7,482,765 | B2 * | 1/2009 | Ito et al. ........................ 315/312 |
| 7,705,543 | B2 * | 4/2010 | Ragonesi et al. ......... 315/209 R |
| 2004/0041620 | A1 * | 3/2004 | D'Angelo et al. ............ 327/534 |

FOREIGN PATENT DOCUMENTS

| DE | 19841270 | 3/2000 |
| DE | 19848925 | 4/2000 |
| DE | 102005012662 | 9/2006 |
| EP | 1006506 | 6/2000 |
| WO | WO 2004/021744 | 3/2004 |
| WO | WO 2006/097329 | 9/2006 |
| WO | WO 2006/136321 | 12/2006 |

OTHER PUBLICATIONS

International Search Report, PCT International Patent Application No. PCT/EP2007/063702, dated Feb. 29, 2008.

* cited by examiner

*Primary Examiner* — Minh D A
(74) *Attorney, Agent, or Firm* — Kenyon & Kenyon LLP (57) ABSTRACT

A device for at least one series circuit of multiple light-emitting diodes, having a voltage regulation unit for regulating an operating voltage for the at least one series circuit of the light-emitting diodes. A current regulation unit for regulating the current through the particular series circuit of light-emitting diodes is provided for each series circuit of light-emitting diodes, and the current regulation unit is connected to the voltage regulation unit in order to transmit a current regulation signal to the voltage regulation unit.

10 Claims, 4 Drawing Sheets

DRIVE DEVICE AND METHOD FOR OPERATING AT LEAST ONE SERIES CIRCUIT OF LIGHT-EMITTING DIODES

FIELD OF THE INVENTION

The present invention is directed to a drive device and method.

BACKGROUND INFORMATION

A drive circuit is described in German Patent Application No. DE 198 41 270 A1 for generating a constant current through at least one light-emitting diode. The drive circuit contains a circuit system for generating a voltage which differs from a specified supply voltage and which is applied to the light-emitting diodes to be operated. A current flowing through the light-emitting diodes is detected by a current detector. The voltage present at the output of the circuit system is selected as a function of the magnitude of the current flowing through the light-emitting diodes.

SUMMARY

An example drive device according to the present invention may have the advantage that on the one hand a high degree of operational reliability is achieved, and on the other hand power loss is minimized. These advantages may be achieved due to the fact that not only the operating voltage of the light-emitting diodes but also the current flowing through the light-emitting diodes is regulated. As a result of the current regulation, first of all it is possible to prevent destruction of the light-emitting diodes due to an excessively high current flow. If unexpectedly strong increases in voltage, voltage fluctuations, or other types of disturbances in voltage generation occur, the current regulation may be used to directly and promptly limit the current conducted through the light-emitting diodes in order to prevent destruction of the light-emitting diodes on account of excessively high current flow. By using the current regulation it is also possible to continuously adjust the voltage until the exact amount of necessary current is able to flow through the series circuit of the light-emitting diodes. This results in an operating point which is close to the minimum possible power loss. In addition, during manufacture of the overall lighting unit the production tolerances of the light-emitting diodes do not have to be compensated, or may be compensated in a less complex way, thereby simplifying the manufacture of such units.

Besides these advantages which result when a series circuit of light-emitting diodes is connected to the drive device according to the example embodiment of the present invention, the following advantages are realized when multiple series circuits of light-emitting diodes are connected in parallel with the example drive device. Because of production-related tolerances, light-emitting diodes have slightly different characteristic curves, so that at a given applied voltage, different current flows result as a function of the characteristic curves of the light-emitting diodes used. For multiple series circuits of light-emitting diodes, under unfavorable conditions these errors may be additive, so that, for example, for two chains connected in parallel in an unfavorable manner one of the two chains does not illuminate, whereas the other chain is destroyed due to the excessively high current flow. By using a current regulation unit which according to the present invention is assigned to each of the series circuits, the current flow through the series circuits may be limited in each case, thereby preventing destruction of a series circuit of light-emitting diodes. At the same time, however, the operating voltage may be increased until all light-emitting diode chains connected to the drive device according to the present invention receive an operating voltage such that a current which is sufficient for light generation may be conducted through the light-emitting diodes. Thus, on the one hand, for multiple series circuits of light-emitting diodes connected in parallel to the drive device, all of the light-emitting diodes may be illuminated, whereas on the other hand, it is not possible for any of the series circuits to be destroyed as the result of excessively high current flow. By feeding a current regulation signal from the current regulation unit to the voltage regulation unit, this feedback may be used to link the current regulation with the voltage regulation in an easily implemented manner to ensure that the necessary current is conducted through all the series circuits of light-emitting diodes. The series circuits of light-emitting diodes are operated at an intended operating point as the result of the current being regulated to the required value. In this manner the optical parameters of the light-emitting diodes are stabilized. Furthermore, destruction of the light-emitting diodes is reliably avoided by suitably rapid regulation of the current. By regulating the supply voltage to exactly the required value, it is also possible to reduce power loss from the current regulation unit as well as from the voltage generator.

Corresponding advantages may be achieved using the example method according to the present invention for operating at least one series circuit of light-emitting diodes.

It may be advantageous to feed the current regulation signals of all series circuits of the light-emitting diodes to one input of the voltage regulation unit. In this manner, monitoring of only one input of the voltage regulation unit, taking into account the current regulation signal associated with the series circuit of light-emitting diodes which requires the highest operating voltage, allows all series circuits to be easily illuminated by selecting the highest required operating voltage. On the other hand, the operating voltage need not be selected to be arbitrarily high, and instead may be adapted to the specific series circuit which requires the highest operating voltage. Multiple series circuits of light-emitting diodes may thus be reliably operated in an energy-conserving manner by using one drive device.

It may also be advantageous for the voltage regulation unit to have a step-up converter so that the operating voltage of the light-emitting diodes may be selected to be greater than a supply input voltage. It is thus possible to provide series circuits of light-emitting diodes which are so large that their operating voltage requirement is higher than a supply voltage which is available for operating the drive device.

A regulation system which is particularly convenient to implement results from one specific embodiment of the voltage regulation unit having two regulation stages, in which a voltage specified by a voltage divider is distorted as a function of the current regulation signal when the current regulation signal is large and the current through the series circuit of light-emitting diodes is small. The regulation stage for distortion of the potential in the center of the voltage divider is preferably designed in such a way that it allows, in at least in a portion of its characteristic curve, a change in the operating voltage of the at least one series circuit of light-emitting diodes which is proportional to the magnitude of the current regulation signal. For this regulation, the second regulation stage in particular has a field effect transistor with a peaking resistor which has a resulting intensified linear response and also does not interfere with the current regulation signal. A different conversion of the current regulation signal is possible as long as the function of the current control loop is not impaired.

It may also be advantageous to provide a transistor, for example a bipolar transistor or field effect transistor, for regulating the current, the current regulation signal being fed to the base of the transistor, thus resulting in a current regulation as a function of the magnitude of the voltage of the current regulation signal. A comparator circuit for comparing a current signal to a reference voltage is preferably provided to ensure reliable adjustment of the current regulation.

It may also be particularly advantageous to use an example display unit according to the present invention in a motor vehicle, in which light-emitting diodes are used in particular for illuminating indicator displays and liquid crystal displays, and sometimes are used in large numbers for units in the vehicle interior. Because of the low operating voltage, practically unlimited color selection, and low heating during operation, a light-emitting diode may be used at various locations in the vehicle for reliable illumination.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

The example drive device according to the present invention for operating a series circuit of light-emitting diodes or multiple series circuits of light-emitting diodes in simultaneous parallel operation may be used for any given lighting purpose. Use in a vehicle is particularly advantageous, since the drive device according to the present invention allows both reliable and economical operation. In particular for the illumination of performance data in the vehicle, it is necessary that functioning of the drive device is continuously ensured so that a driver is able to read corresponding performance data. For this purpose the drive device according to the present invention may, for example, be introduced into a so-called combination instrument in front of the driver in which numerous display units, such as an indicator display or liquid crystal display, for example, are incorporated. Power is supplied via the vehicle electrical system, using a supply voltage between 10 V and 12 V, for example. To enable a light-emitting diode to emit the appropriate amount of light, the applied voltage must exceed the band gap of the semiconductor material used. The band gap corresponds to the energy of the emitted light particles. This results in total required operating voltages between 1.2 V and 4 V for each light-emitting diode. Thus, using the power supply of a vehicle, it would be possible to reliably operate only a limited number of light-emitting diodes in a series circuit. Therefore, in the following discussion the present invention is explained for exemplary embodiments in which a greater number of light-emitting diodes are connected in series. The voltage necessary for this purpose, which is greater than the available vehicle electric system voltage, is provided by an appropriate voltage generator. However, the present invention may also be used for smaller systems in which lower voltages are required and it is not necessary for the voltage generator to step up the required operating voltage. On the other hand, in particular for applications outside the vehicle, it is also possible to connect the drive device according to the present invention to the power grid, and by use of the voltage generator to generate from the power grid voltage an operating direct voltage of the intended magnitude. The present invention is explained below, using the example of an operation of a series circuit of light-emitting diodes in which an operating direct voltage is stepped up for operation of the light-emitting diodes.

Figure 1:
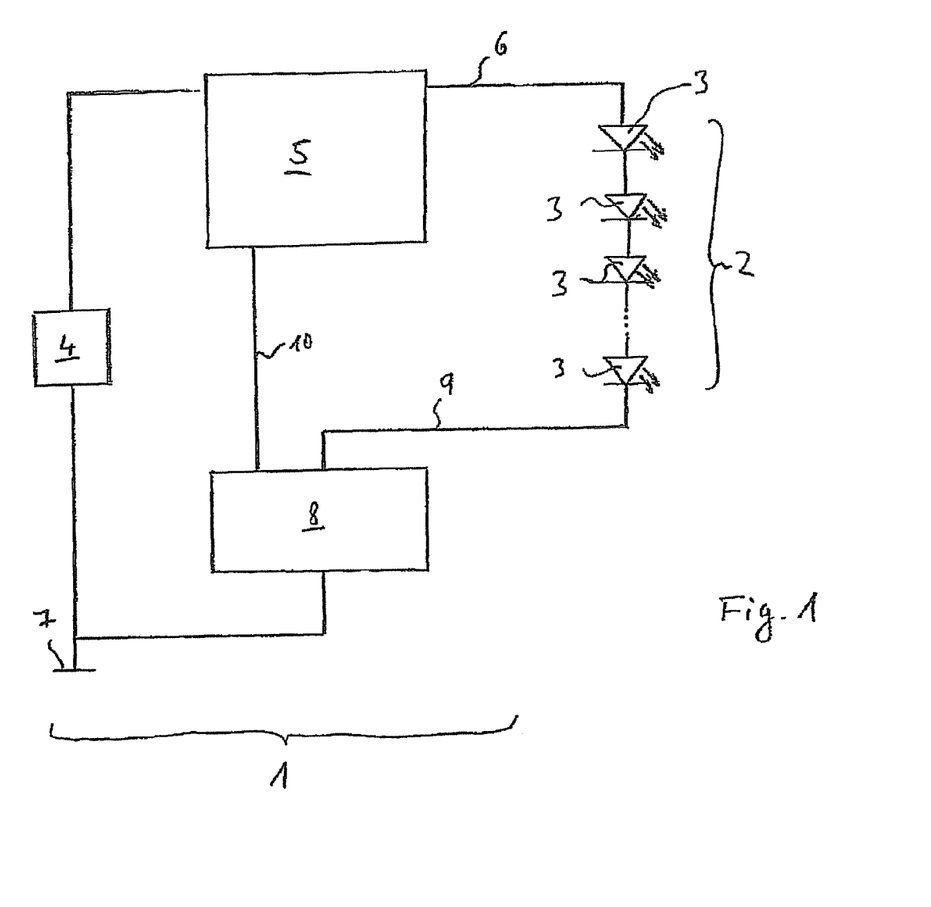
FIG. 1 shows a first exemplary embodiment of a drive device according to the present invention.

FIG. 1 shows a first exemplary embodiment of a drive device 1 according to the present invention. A series circuit 2 of light-emitting diodes 3 is connected to drive device 1, light-emitting diodes 3 being connected in series in appropriate numbers in the conducting direction. A power supply 4 which delivers a supply voltage is provided for operating the circuit. In a vehicle, the power supply may be the vehicle electrical system, i.e., the vehicle battery. The supply voltage is fed to a voltage regulation unit 5 which outputs an operating voltage for operating series circuit 2 of light-emitting diodes 3. This operating voltage is applied at an output 6 of voltage regulation unit 5 with respect to ground 7. Series circuit 2 is operated in the conducting direction, and in output 6 of voltage regulation unit 5 is connected to an input 9 of a current regulation unit 8. Current regulation unit 8 in turn is connected to ground, so that a current is conducted through series circuit 2 of light-emitting diodes 3, from output 6 of voltage regulation unit 5, through series circuit 2, and via current regulation unit 8 to ground. Through the series circuit the voltage drops at the individual light-emitting diodes are added up, so that for generation of light, for example from ten light-emitting diodes with a required voltage of 3.2 V, a total voltage of 32 V must be applied in order to conduct sufficient current through light-emitting diodes 3. In addition, a further voltage drop typically occurs in current regulation unit 8.

Lighting operation requires a current of 100 mA, for example. As long as current regulation unit 8 does not measure this current from its input 9 to ground 7, current regulation by current regulation unit 8 is switched through via a current regulation signal from input 9 to ground 7. This current regulation signal is also relayed to voltage regulation unit 5 via a connection 10. When the appropriate current regulation signal corresponding to through switching of the current regulator is received by voltage regulation unit 5, the output voltage present at output 6 of voltage regulation unit 5 is increased. When a current starts to flow through light-emitting diodes 3, and thus also through current regulation unit 8, the current regulation signal is decreased so that the current flow through light-emitting diodes 2 is not hindered, but the current regulation signal has a lower voltage. The lower current regulation signal is fed to voltage regulation unit 5, so that the operating voltage output at output 6 is held constant and is not further increased. If the current further increases for other reasons, for example as the result of heating during operation, current regulation unit 8 is able to limit the current by correspondingly decreasing the current regulation signal.

If the required voltage for light-emitting diodes 3 further increases for other reasons, for example as the result of a temperature change during operation, voltage regulation unit 5 is able, on the one hand, to minimize the power loss in the current regulation unit by appropriately adjusting the voltage present at output 6, and on the other hand, to allow a current flow through the light-emitting diodes which results in light generation. By relaying the current regulation signal at an appropriate voltage to voltage regulation unit 5, the current regulation signal may contribute to a reduction of the operating voltage.

Figure 2:
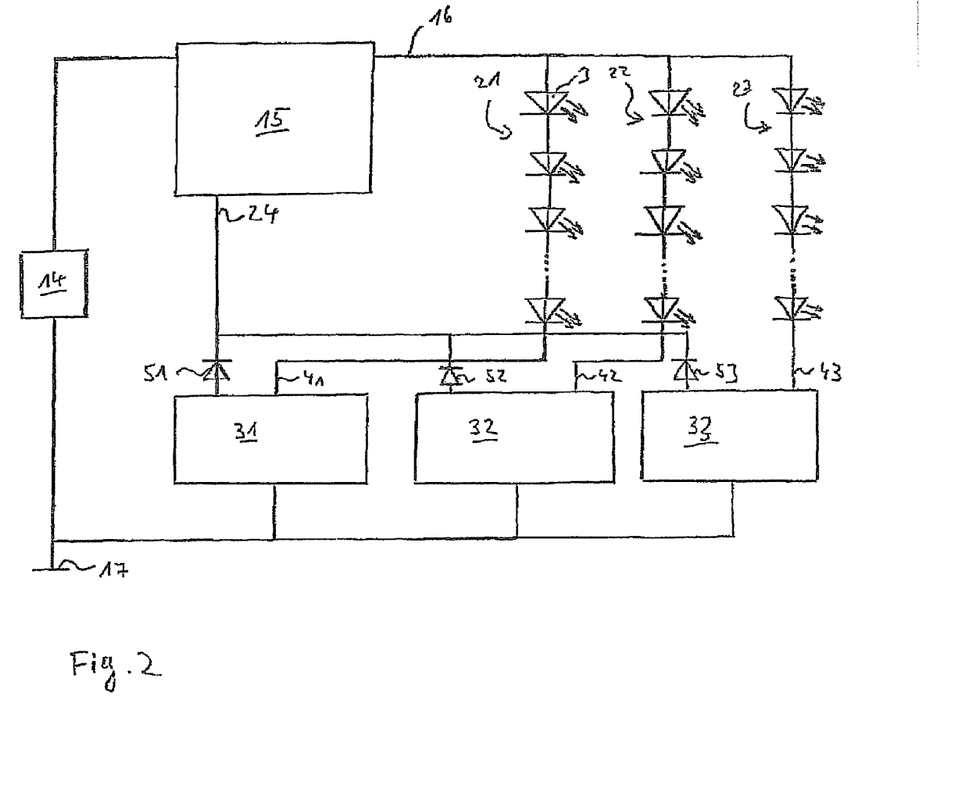
FIG. 2 shows a further exemplary embodiment of a drive device according to the present invention.

FIG. 2 illustrates a further embodiment of the present invention in which the drive device is expanded, and multiple series circuits of light-emitting diodes are connected to a voltage regulation unit 15. Voltage regulation unit 15 is provided with supply voltage by a power source 14. A first series circuit 21, a second series circuit 22, and a third series circuit 23 of light-emitting diodes 3 are connected in parallel to an output 16 of voltage regulation unit 15. A first current regulation unit 31 is associated with first series circuit 21, a second current regulation unit 32 is associated with second series circuit 22, and a third current regulation unit 33 is associated with third series circuit 23. Series circuits 21, 22, 23 are connected to inputs 41, 42, 43, respectively, of the associated current regulation unit, and are connected to ground 17 via respective current regulation units 31, 32, 33. A current regulation signal is transmitted from each current regulation unit 31, 32, 33, via respective diode 51, 52, 53, to an input 24 of voltage regulation unit 15. Diodes 51, 52, 53 are provided to ensure that the current regulation signals from current regulation units 31, 32, 33 reach voltage regulation unit 15 but are not able to flow back into the other current regulation units. However, according to FIG. 1 a corresponding diode may also be introduced into the current regulation unit or into the input of voltage regulation unit 5. Instead of the diode, another means of decoupling the signals may be provided. Thus, multiple lines may be run from current regulation units 31, 32, 33 to voltage regulation unit 15, a corresponding input being protected, preferably by a diode.

The mode of operation of the circuit according to FIG. 2 corresponds primarily to the structure according to FIG. 1. The light-emitting diodes are preferably connected in parallel, in similar numbers and in similar voltage ratios, in the various rows. Voltage regulation unit 15 begins with a starting voltage value which generally is not sufficient for operating one of the series circuits of light-emitting diodes. Via the corresponding current regulation signals, voltage regulation unit 15 receives information that current is not yet flowing through at least one of the series circuits. The voltage is then increased until a current is conducted through the first series circuit. At this time no current is yet conducted through the other series circuits, so that appropriately large current regulation signals are relayed to voltage regulation unit 15 until only one of the series circuits has no current conducted through it. In this case as well, the operating voltage is further increased until a corresponding specified current also flows through this series circuit. At this time the first series circuit, through which a current flows, could conduct a current of such magnitude that without a current limiter this series circuit, or at least one of the light-emitting diodes of this series circuit, could be destroyed. However, the current flowing through the series circuit is limited by use of the associated current regulation.

Structurally identical light-emitting diodes, in particular of the same color, may be used in a series circuit. It is also possible to use different light-emitting diodes in a series circuit. This is also true for multiple rows connected in parallel, which may also differ in the number of light-emitting diodes provided in a series circuit while making use of the operation according to the present invention.

Figure 3:
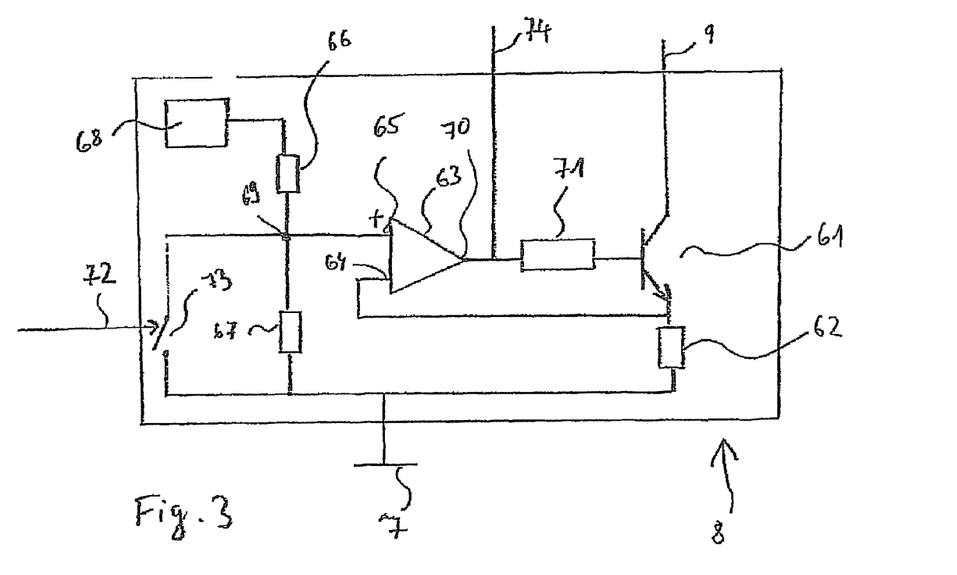
FIG. 3 shows an exemplary embodiment of a current regulation unit according to the present invention.

FIG. 3 illustrates one specific exemplary embodiment for a current regulation unit, such as current regulation unit 8, for example. Current regulation units 31, 32, and 33 also have a corresponding design. The series circuit of light-emitting diodes is connected to current regulation unit 8 via an input 9. This input is fed to a transistor 61. The collector of the transistor is connected to ground 7 via a resistor 62. The voltage is tapped between resistor 62 and the collector for transistor 61 and fed to an input 64 of an operational amplifier 63. The other input 65 of operational amplifier 63 is connected to center tap 69 of a voltage divider. The voltage divider is composed of a first resistor 66 and a second resistor 67. A voltage which is generated by a power source 68 is fed through the two resistors 66, 67. Thus, the voltage at tap 69 of the voltage divider may be specified by the ratio of resistors 66, 67. This voltage is fed to an input of operational amplifier 63. This voltage constitutes the reference voltage, which operational amplifier 63 compares to the voltage that is tapped between the collector of transistor 61 and resistor 62. The reference voltage may also be generated by other circuits, for example using Zener diodes, or also by applying a voltage which is output by another signal source, for example by an audio signal source, in particular audio signals. Output 70 of the operational amplifier is connected via a resistor 71 to the base of transistor 61. As a result of the mode of operation of operational amplifier 63, in which a voltage difference between the two inputs 64, 65 is almost "infinitely" amplified, within the scope of the output voltage that is available to operational amplifier 63, the operational amplifier regulates the output voltage in such a way that the specified reference voltage drops at input 64, and thus between transistor 61 and resistor 62. Thus, by appropriate selection of resistor 62, as well as of the reference voltage at tap 69, using resistors 66 and 67 in conjunction with power source 68, the current which is intended to flow through resistor 62 may also be specified. If the current increases, operational amplifier 63 reduces the current flow through transistor 61 via the base control. If the current is too low, transistor 61 is increased via the base.

By use of an additional input 72 for the current regulation unit, it is also possible to connect second input 65 of the operational amplifier to ground via a short circuit of second resistor 67 for the voltage divider. In this manner the intended current flow through resistor 62 is regulated to zero, so that the operational amplifier regulates output 70 to zero and blocks transistor 61. For this purpose a switching element 73 is activated via input 72. In addition to a strict upward/downward regulation, it is also possible via input 72 to regulate the current through resistor 62 and thus also the current through the series circuit of light-emitting diodes, for example using a pulse-width modulated square-wave signal, thereby dimming the light-emitting diodes. For the case in which no current is flowing, operational amplifier 63 outputs its maximum output voltage, which corresponds approximately to the supply voltage, to output 70 of the operational amplifier.

The current regulation signal is also tapped between operational amplifier 63 and transistor 61, a resistor 71 preferably being provided between operational amplifier 63 and transistor 61, and the tap occurring between resistor 71 and operational amplifier 63. The current regulation signal is relayed to voltage regulation unit 5 via an output 74. Resistor 71 has a value of 400Ω, for example. Resistor 71 also ensures that it is possible to emit a control signal having sufficient voltage for further processing to output 74. A conventional transistor or also a field effect transistor may be used for transistor 61. The dimensions of resistor 71 must be adapted to the transistor used. When a field effect transistor is used, a resistor 71 may be omitted entirely. Resistor 62 should be selected to be as small as possible so that the current flow through the series circuit of light-emitting diodes is not unnecessarily hindered. A typical value may be approximately 6Ω.

Figure 4:
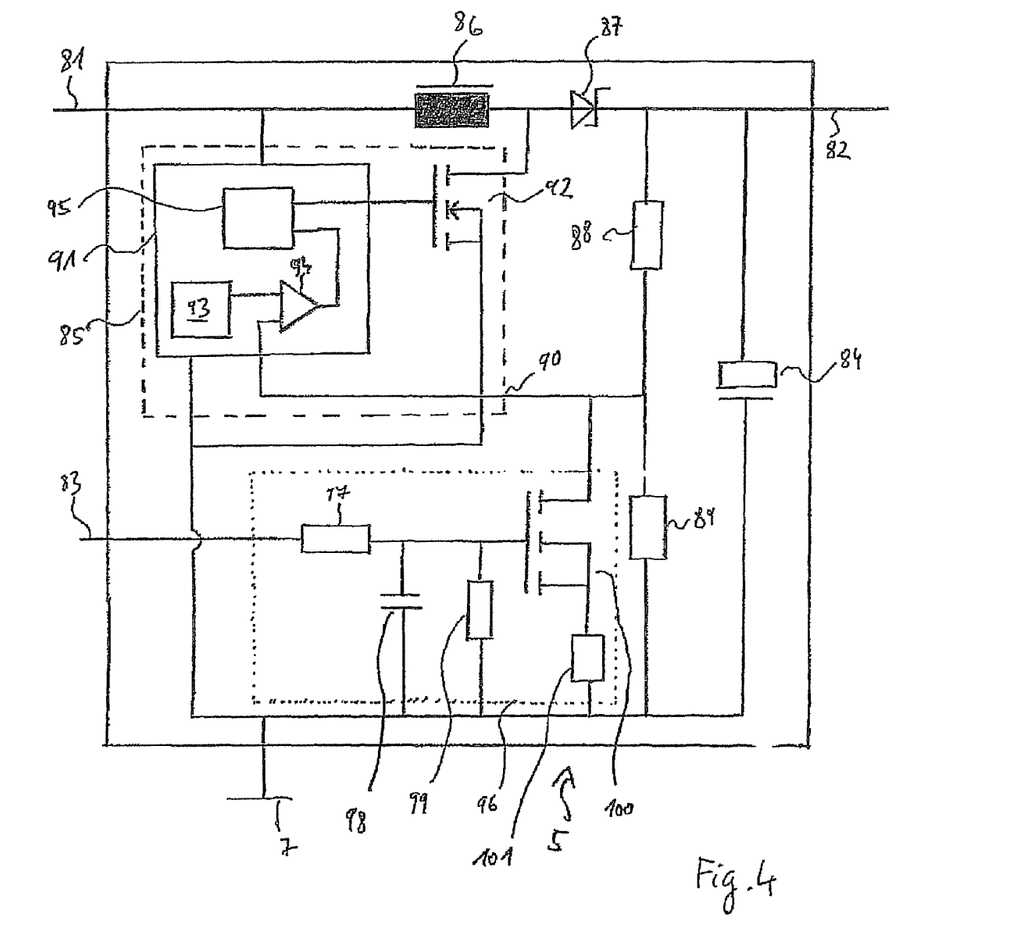
FIG. 4 shows an exemplary embodiment of a voltage regulation unit according to the present invention.

FIG. 4 illustrates one specific exemplary embodiment for a voltage regulation unit 5 according to the present invention. Voltage regulation unit 5 has a first input 81 via which the voltage regulation unit is provided with supply voltage. The voltage regulation unit also has an output 82 via which the operating voltage for the at least one series circuit of light-emitting diodes is conducted from voltage regulation unit 5. The current regulation signal of voltage regulation unit 5 is fed via a second input 83. Voltage regulation unit 5 is also connected to ground 7 via a first terminal. Voltage regulation unit 5 has a capacitor 84 which is charged to the operating voltage for operating the at least one series circuit of light-emitting diodes. A current flow is periodically switched from input 81 to ground using a coil 86, via a first regulation stage 85, illustrated with a dashed-line border in FIG. 4. The change in voltage induces voltage peaks which are fed via diode 87, which is designed as a Schottky diode, for example, to output 82, and thus also to capacitor 84, thus allowing the capacitor to be charged to a voltage which greatly exceeds the supply voltage that is fed to input 81. The first regulation stage receives as reference voltage a signal which is tapped from a voltage divider between a first resistor 88 and a second resistor 89, the two resistors 88, 89 being connected in parallel with charging capacitor 84. The operating voltage is thus present at the voltage divider for the two resistors 88, 89. The intermediate voltage tapped at the voltage divider is fed to an input 90 for first regulation stage 85. First regulation stage 85 has a control circuit 91 and a circuit breaker, which in the present illustrated exemplary embodiment is designed as a field effect transistor 92. Control circuit 91 has a reference voltage source 93, the reference voltage signal provided by the reference voltage source and the signal received via input 90 being fed to an operational amplifier 94. The output signal of operational amplifier 94 activates a pulse-width modulation circuit 95, thereby influencing the pulse width and/or the frequency at which the gate of field effect transistor 92 is activated. The source terminal for the field effect transistor is connected between coil 86 and Schottky diode 87, whereas the drain terminal is either directly or indirectly connected to ground via additional components such as shunts, for example. If the voltage at output 82 increases, further switching of field effect transistor 92 is discontinued, thus preventing capacitor 84 from further charging. If capacitor 84 is charged via a current flow, for example via the light-emitting diodes, recharging is performed by activating field effect transistor 92 according to the described control.

A second regulation stage 96, illustrated with a dotted-line border in FIG. 4, is also provided. Second regulation stage 96 is used to reduce, as needed, the potential at input 90 of the first regulation stage as a function of the current regulation signal received from second input 83. In one specific embodiment, in the second regulation stage the current regulation signal is first fed to a low-pass filter composed of a first resistor 97 and a capacitor 98. The low-pass filter is used to smooth any pulses which are superimposed on the current regulation signal. The current regulation signal, optionally after integration, is fed via low-pass filter 97, 98 to the gate of a field effect transistor 100. The source terminal of field effect transistor 100 is connected to input 90 of first regulation stage 85. The drain terminal of field effect transistor 100 is connected to ground 7, either directly or, in another specific embodiment, via an ohmic resistor 101. Resistor 101 linearizes the quadratic characteristic curve of field effect transistor 100, and at the same time sets a maximum output voltage which is present at output 82. A different analog switch, such as a bipolar transistor, for example, may be used instead of field effect transistor 100. If the current regulation signal, which optionally is smoothed by the integrating effect of the incoming low-pass filter, exceeds the activating voltage level of field effect transistor 100, this results in current flow through field effect transistor 100, thereby connecting the internal resistance of the field effect transistor, and optionally resistor 101 connected in series thereto, in parallel with resistor 89 of the voltage divider. This causes the ohmic resistance in the lower section of the voltage divider to drop, thereby shifting the voltage divider ratio. As a result, the electrical potential drops at input 90 of the first regulation stage. To avoid charging effects of the field effect transistor or capacitor 98, capacitor 98 for the low-pass filter is connected in parallel with an additional ohmic resistor 99, thereby discharging capacitor 98 over time.

When the voltage regulation unit is switched on, initially only the supply voltage which is fed via input 81 is available. The voltage still remaining through voltage divider 88, 89 is present at input 90 of first regulation stage 85. This voltage is lower than the reference voltage which is specified by reference voltage source 93, so that field effect transistor 92 is activated via an emitted pulse signal, thereby charging capacitor 84 and increasing the output voltage at output 82. If the target voltage specified by reference voltage source 93 is then reached at input 90 as a result of this voltage increase, initially no further increase in voltage would occur through the first regulation stage. Reference voltage source 93 is preferably set so that either none of the provided series circuits of light-emitting diodes can be operated, or so that the series circuits may be operated at least in only a very favorable case, i.e., in which the voltages are very low at all necessary light-emitting diodes, which would be just sufficient for operation.

For the case in which the voltage thus output at output 82 would still be insufficient to operate the series circuit of light-emitting diodes, or, for multiple light-emitting diodes, would at least be insufficient to switch on all the light-emitting diodes, at least one current regulation signal from at least one of the current regulation units which is above a predetermined threshold is output via second input 83. As a result of the control signal, field effect transistor 100, optionally also in a linear characteristic curve range, is opened. As described above, this causes the potential to drop at input 90 of first regulation stage 85. However, since in this case the potential drops, the fed voltage also changes at operational amplifier 94, so that reference voltage 93 is no longer achieved. However, this activates pulse-width modulation circuit 95 and thus sends a pulse signal to the gate of field effect transistor 92, thereby further increasing the operating voltage. Field effect transistor 100 is not closed again until a current regulation signal which is above a predetermined threshold of approximately 3 V is no longer emitted at any of the connected current regulation units, so that a further increase in the voltage through the first regulation stage is discontinued and the voltage which is then present is initially maintained. For the case in which the current drops again, field effect transistor 100 may be reactivated by increasing the current regulation signal. Field effect transistor 100 is thus continuously activated to a greater or lesser degree during normal operation, and is therefore situated in the linear, analog range. In normal steady-state operation the change in the required forward voltages of the LED series circuits is gradual and slight, so that only very brief, weak control interventions take place via second input 83 for feeding the current regulation signal.

What is claimed is:

1. A drive device for at least one series circuit of multiple light-emitting diodes, comprising:

a voltage regulation unit adapted to regulate an operating voltage for the at least one series circuit of the light-emitting diodes; and a current regulation unit for each of the at least one series circuit of light-emitting diodes, the current regulation unit adapted to regulate the current through the particular series circuit of light-emitting diodes, the current regulation unit being connected to the voltage regulation unit to transmit a current regulation signal to the voltage regulation unit;

wherein the voltage regulation unit includes a voltage divider, the voltage divider being connected between an operating voltage of the at least one series circuit of light-emitting diodes provided by the voltage regulation unit, and ground, and wherein a tap of the voltage divider and an input of a first regulation stage are connected to an output of a second regulation stage so that when the current regulation signal exceeds a predetermined voltage a voltage at the tap of the voltage divider is reduced.

2. The drive device as recited in claim 1, wherein the current regulation signals of all series circuits of the light-emitting diodes are fed to one input of the voltage regulation device.

3. The drive device as recited in claim 1, wherein the voltage regulation unit includes a step-up converter to generate an operating voltage for the at least one series circuit of the light-emitting diodes.

4. The drive device as recited in claim 1, wherein the tap of the voltage divider is connected to an input of the first regulation stage to set the operating voltage of the at least one series circuit of light-emitting diodes, the current regulation signal being applied to the second regulation stage of the voltage regulation unit.

5. The drive device as recited in claim 4, wherein the second regulation stage has a field effect transistor, the current regulation signal is fed to a gate of the field effect transistor, a drain terminal is connected to ground via a resistor, and a source terminal is coupled to the tap of the voltage divider.

6. The drive device as recited in claim 1, wherein each of the series circuits of light-emitting diodes is connected in series to a transistor, and the current regulation signal is fed to a base of the transistor to regulate current through the series circuit of light-emitting diodes.

7. The drive device as recited in claim 1, wherein each of the series circuits of light-emitting diodes is connected in series to a resistor whose one side is connected to ground, and to generate the current regulation signal, a dropping voltage across the resistor and a reference voltage are applied to a comparator circuit.

8. A display instrument in a vehicle, comprising:
a display unit having at least one series circuit of light-emitting diodes;
a voltage regulation unit adapted to regulate an operating voltage for the at least one series circuit of the light-emitting diodes; and
a current regulation unit for each of the at least one series circuit of light-emitting diodes, the current regulation unit adapted to regulate the current through the particular series circuit of light-emitting diodes, the current regulation unit being connected to the voltage regulation unit to transmit a current regulation signal to the voltage regulation unit;
wherein the voltage regulation unit includes a voltage divider, the voltage divider being connected between an operating voltage of the at least one series circuit of light-emitting diodes provided by the voltage regulation unit, and ground, and
wherein a tap of the voltage divider and an input of a first regulation stage are connected to an output of a second regulation stage so that when the current regulation signal exceeds a predetermined voltage a voltage at the tap of the voltage divider is reduced.

9. A method for operating at least one series circuit of light-emitting diodes, comprising:
selecting an operating voltage of the at least one series circuit of light-emitting diodes as a function of a current regulation signal to control current through one of the at least one series circuit of light-emitting diodes and a voltage divider; and
reducing a voltage at a tap of the voltage divider when the current regulation signal exceeds a predetermined voltage, wherein the tap of the voltage divider and an input of a first regulation stage are connected to an output of a second regulation stage.

10. The method as recited in claim 9, wherein operating voltage of the at least one series circuit of light-emitting diodes is increased until a voltage of the current regulation signal of all series circuits of light-emitting diodes exceeds the predetermined threshold.

* * * * *

UNITED STATES PATENT AND TRADEMARK OFFICE
CERTIFICATE OF CORRECTION

PATENT NO. : 8,519,632 B2  Page 1 of 1
APPLICATION NO. : 12/305628
DATED : August 27, 2013
INVENTOR(S) : Krespach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Fifteenth Day of September, 2015

Michelle K. Lee
*Director of the United States Patent and Trademark Office*